United States Patent [19]
Meltzer et al.

[11] Patent Number: 4,712,214
[45] Date of Patent: Dec. 8, 1987

[54] PROTOCOL FOR HANDLING TRANSMISSION ERRORS OVER ASYNCHRONOUS COMMUNICATION LINES

[75] Inventors: Clifford B. Meltzer, Peekskill; Krishnamurthi Kannan, Yorktown Heights; Thomas G. Burket, Pleasantville; Deborah J. Kruesi, Delmar; Gordon W. Braudaway, Peekskill, all of N.Y.

[73] Assignee: International Business Machines Corporation, Armonk, N.Y.

[21] Appl. No.: 817,699

[22] Filed: Jan. 10, 1986

[51] Int. Cl.[4] .................. G06F 11/10; G08C 25/00
[52] U.S. Cl. .................. 371/32; 370/43; 370/60
[58] Field of Search .............. 371/32, 33, 35; 370/43, 370/60, 94; 364/200 MS File, 900 MS File

[56] References Cited

U.S. PATENT DOCUMENTS

| | | | |
|---|---|---|---|
| 3,452,330 | 6/1969 | Avery | 371/32 |
| 3,824,547 | 7/1974 | Green | 371/32 |
| 4,377,862 | 3/1983 | Koford | 371/32 |
| 4,422,171 | 12/1983 | Wortley | 371/32 |
| 4,439,859 | 3/1984 | Donnan | 371/32 |
| 4,507,782 | 3/1985 | Kunimasa | 371/32 |
| 4,551,839 | 11/1985 | Botrel | 371/35 |
| 4,561,090 | 12/1985 | Turner | 370/94 X |

*Primary Examiner*—Jerry Smith
*Assistant Examiner*—Robert W. Beausoliel, Jr.
*Attorney, Agent, or Firm*—Thomas P. Dowd

[57] ABSTRACT

A system or scheme for automatic detection of and recovery from transmission errors in the asynchronous communication mode at the data link level with complete transparency at the higher levels is disclosed wherein the transmissions are in the form of a sequence of data packets, and an improved combination of end-of-text (ETX) bytes along with checksums is used in each data packet to detect errors. The ETX character is dynamically selected for each packet after the data comprising the packet has been assembled. This character is coded differently from the remaining character codes in its respective packet and is made the second byte thereof following the start-of-text byte (STX). The third byte in each packet is made the complement of the preceding ETX byte, the latter of which is also made the last byte in the packet. Thus, the second and last bytes in each packet are identical, and different from all the other bytes, and the third byte is their complement. Other bytes in each packet include: one byte indicating the location of the packet in a set in a given transmission sequence; a byte distinguishing the packet's set from other transmission sequences; two bytes indicative of the number of data bytes in the packet; one byte operating as a control character indicating the functional nature of the packet; data bytes; and, two checksum bytes which precede the last ETX byte. Among the advantages of transmissions using packets containing the foregoing improved combination of bytes, is the fact that all transmission errors will be detected and upon detection of an error in a packet, the transmitter is immediately notified and retransmission is carried out only from the erroneous packet rather than from the beginning of the entire sequence as in the prior art.

20 Claims, 2 Drawing Figures

DATA PACKET AT LINK LEVEL

| 1 | 2 | 3 | 4 | 5,6 | 7 | 8 | 8+m | 9,10+m | 11+m |
|---|---|---|---|---|---|---|---|---|---|
| STX | ETX | ETX INV | SEQ NUM | BYTE COUNT | SEQ CNTL FLAG | CNTL FIELD | DATA BYTES | CHECK SUM | ETX |
| 1 | 1 | 1 | 1 | 2 | 1 | 1 | ←— m —→ | 2 | 1 |

PROTOCOL FOR HANDLING TRANSMISSION ERRORS OVER ASYNCHRONOUS COMMUNICATION LINES

FIELD OF THE INVENTION

The present invention relates to asynchronous communication systems and more particularly to a protocol for the detection of and recovery from transmission errors over asynchronous communication lines.

BACKGROUND OF THE INVENTION

Traditionally, remote access communication using the asynchronous mode of operation has relied on simple parity schemes on each byte of transmitted data, e.g., parity bits on byte boundaries, for error detection. This usually meant that one bit out of the 8 bits was reserved for parity and the remaining 7 bits were used for data. In general, however, all 8 bits in a byte may be required for use by higher layers in a communication hierarchy. Furthermore, the single-bit parity schemes enabled these existing systems to merely detect the error without provision for automatic correction and/or recovery. It was left to the end-user to attempt recovery by requesting re-transmission of data that looked garbled. With the advent of Videotex and concomitant presentation data encoding schemes, such as the North American Presentation Level Protocol Syntax (NAPLPS), the need for recovery from transmission errors became more apparent than hitherto foreseen. This is due to the high level of compression that these data encoding schemes utilize. An error in a single byte could lead to dramatic differences in what the end-user might perceive. The frequency and extent of such errors could seriously detract from the ease of use of Videotex.

The prior art has attempted to improve error control while avoiding loss of data capacity in asynchronous communications by stripping the parity bits and reformatting the data into packets with checksum bits for transmission, and then converting the received data back to usable standard form. An example of such a system is disclosed in U.S. Pat. No. 4,377,862 to Koford. However, such systems require special hardware to be compatible with standard modems and cannot be implemented purely with software. Other known attempts or possible attempts to deal with the problem, such as bisynchronous or other mode transmissions, would all appear to require special added hardware or different and more costly operating systems. Further prior art examples are found in U.S. Pat. No. 4,304,001 to Cope and U.S. Pat. No. 3,676,859 to Holloway et al.

In any event, no system is believed to presently be known which offers low-cost, high-efficiency, automatic detection and correction of asynchronous transmission errors and which is capable of use with standard modems. The system of the present invention is directed toward this end.

SUMMARY OF THE INVENTION

The present invention involves a system or scheme for automatic detection of and recovery from transmission errors in the asynchronous communication mode at the data link level with complete transparency at the higher levels. Among the features of the system is the providing of checksums on a sequence of data packets such that re-transmission is limited to only those packets that follow a packet with a checksum error. Such a scheme has a better chance of completing a transmission than any scheme requiring full re-transmission.

A further feature of the the invention uses a combination of end-of-text (ETX) bytes in each data packet (of n bytes) of the asynchronous transmission. Firstly, an ETX character is dynamically selected for each packet after the data comprising the packet has been assembled. This character is coded differently from the remaining character codes in its respective packet and is made the second byte thereof following the start-of-text byte (STX). The third byte in each packet is made the complement of the preceding ETX byte, the latter of which is also made the last byte in the packet. Thus, the second and last bytes in each packet are identical, and different from all the other bytes, and the third byte is their complement. Other bytes in each packet include: one byte indicating the location of the packet in a set in a given transmission sequence; a byte distinguishing the packet's set from other transmission sequences; two bytes indicative of the number of data bytes in the packet; one byte operating as a control character indicating the functional nature of the packet; data bytes; and, two checksum bytes which precede the last ETX byte. Also, the functional nature byte may include a 'pause' character which asks the receiver to respond with an ACK or NACK packet regarding the packets already received correctly. This limits the number of packets with an acknowledgement pending, permitting less data storage at the transmitter. With the transmission of packets containing the foregoing improved combination of bytes, upon detection of an error in a packet, the transmitter is immediately notified and retransmission is carried out only from the erroneous packet rather than from the beginning of the entire sequence as in the prior art.

The invention is particularly suitable for use in systems involving communication with and between personal computers (PCs), and systems using asynchronous modems for telesoftware purposes generally. It is amenable to being embodied in a software product capable of utilization by any PC user with a standard modem for point-to-point communication without the need for a large host computer or network, although it is also suitable for use with central systems and Videotex networks.

DETAILED DESCRIPTION OF THE INVENTION

Figure 1:
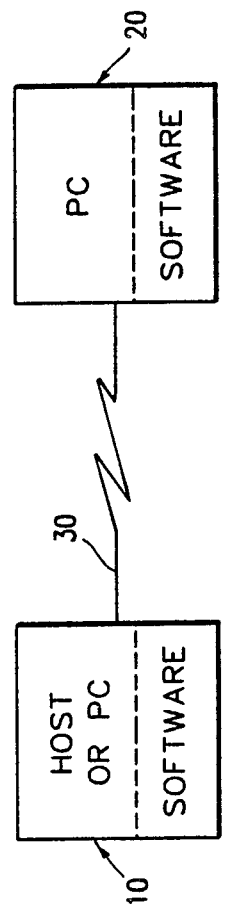
FIG. 1 is a block diagram of a Videotex system toward which the present invention is directed.

As seen in FIG. 1, a system in which the present invention is suitable for incorporation may include: a host computer 10, in the form of a mainframe, network, a personal computer, for exchanging asynchronous transmissions over suitable transmission lines 30. The invention is particularly suitable for dealing with Videotex transmissions.

All transmissions from host to terminal or from terminal to host are conducted in terms of packets. These data-containing packets may be of variable length, but each can be no more than n bytes (including all the control bytes proposed in accordance with the invention). There is a trade-off involved in the selection of this maximum size. Increasing the maximum size would generally result in lower CPU overheads as well as slightly (but not visibly) lower transmission time per application recognizable data unit. On the other hand, larger packets require larger transmission buffers on the host. These buffers are in addition to the application buffer, since packetization requires re-formatting of data to be transmitted. Small buffers consume less memory on the host but require additional CPU cycles for buffer set-up, etc. A packet may range in size from 11 bytes (no data) to whatever constitutes the "full" packet size used to break up large data units into multiple packets. In a preferred embodiment, the "full" packet may be as large as 256 bytes. The scheme herein described in accordance with the present invention is intended for use with all packet sizes from 11 bytes up to and including 258 bytes.

Figure 2:
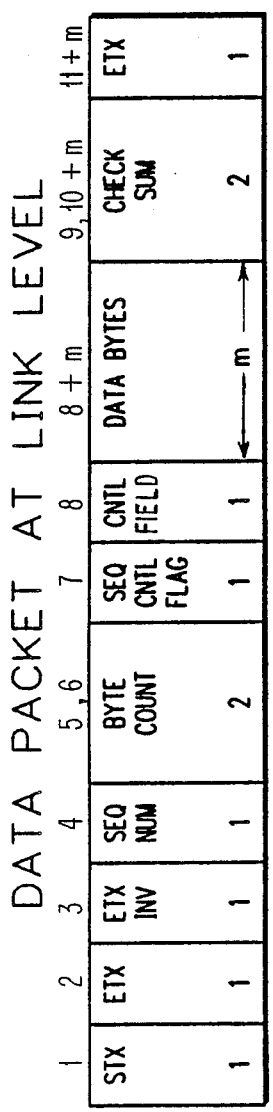
FIG. 2 illustrates the elements in a data packet at link level in accordance with the invention.

FIG. 2 shows the layout of an exemplary data packet at link level. As seen in FIG. 2, the first or starting byte of a packet is always the character STX (ASCII code point X'02'). The second byte represents the ETX character whose re-occurrence in the packet signifies the end of this packet. The third byte represents the logical complement of the ETX character (as will be more fully described below) and is called ETXINV. The fourth byte contains an 8-bit unsigned integer which is designated as a sequence field. The sequence field indicates the packet's relative number within a set of packets representing a data unit (such as a Videotex page) for higher layer protocols. Sequence numbering starts with 1 and can reach up to 255. Thus, the maximum number of data bytes that could be sent as a unit is 62475 (245×255). The fifth and sixth bytes form a 16-bit unsigned integer representing the number of data bytes in the packet. It varies between 0 and 245, inclusive. Byte seven is a sequence control flag. It distinguishes between a data unit (set of packets) and its successor. Byte eight is an 8-bit control field the contents of which are shown in Table 1.

TABLE 1

CONTROL FIELDS IN DATA PACKET

| Control Field | Meaning |
|---|---|
| 00000000 | Not allowed |
| 01000100 | ASCII "D", a data packet |
| 01001100 | ASCII "L", the last data packet. |
| 01010000 | ASCII "P", pause; asks receiver to respond to whether the packet referenced in the sequence number field and all preceding packets have been received correctly. Response is an ACK or NACK packet. Its purpose is to limit the number of packets that have an acknowledgment pending. |
| 01000001 | ASCII "A", an ACK packet (to be sent after successful reception of the last data packet) |
| 01001110 | ASCII "N", NACK; sequence number of last packet received correctly is in the sequence field. |
| 01010010 | ASCII "R", resend; causes a resend of last ACK or NACK packet |
| 01000011 | ASCII "C", cancel current transmission altogether and await my transmission (used to abort an ongoing transmission and provide for terminal or host to initiate input to a higher layer of protocol). |
| 01010011 | ASCII "S", stop the transmission. No more is coming and ignore all the packets in the current set. The application should not process those packets. |

Following the control field are m data bytes (where m=0–245). After the data bytes are two bytes that are the checksum for the packet. The checksum is computed on all bytes after the STX, the first ETX byte and ETXINV, up to the last data byte. Therefore, it includes sequence, count, and control bytes. The checksum may be computed by a straight sum of the required bytes, which results in a value that will fit in two bytes. Alternatively, a cyclic redundancy check is possible, which also requires a two-byte checksum. In either case the packet has the same form but the checksum differs.

The preferred implementation utilizes Cyclic Redundancy Code (CRC) based checksums which are generated and verified using an algorithm as follows. This algorithm was chosen because of its superior error detection capability and its efficiency for a software implementation but the use of other suitable algorithms for this purpose is possible and contemplated within the scope of the invention. Unlike the traditional CRC algorithm which processes only one data bit at a time, this preferred algorithm processes a group of y data bits at a time. One of the standard CRC generator polynomials is used. The algorithm requires a table of $2^y$ "dividend modifiers." A dividend modifier is generated by taking one of the possible y-bit sequences and applying the traditional bit-at-a-time CRC algorithm to it. The result is stored in the table at the location indexed by the orginal y-bit value. Once the table has been created, the CRC remainder of any k×y bit checksum unit can be computed.

An exemplary implementation uses y=8 bits (one byte) and the CRC-CCITT generator polynomial $(x^{16}+x^{12}+x^5+1)$. The CRC remainder of a k-byte checksum unit is computed by appending 2 bytes of 0's to the low order (right) end of the checksum unit to form a k+2 byte dividend. The following three steps are then repeated k times:

1. the leftmost dividend byte, byte 0, is used as an index into the table of dividend modifiers;
2. bytes 1 and 2 are combined with the designated sixteen-bit dividend modifier using an EXCLUSIVE OR; and
3. the dividend is shifted left 8 bit positions.

The sender inserts the final bytes, 0 and 1, into the two appended bytes of the augmented message to form the revised message. When the receiver gets the revised message, it recomputes the CRC remainder using the three steps listed above. After k iterations, bytes 0 and 1 of the dividend will be zero if the message has been received without error.

Finally, the last byte in the packet is always the ETX character (which in the present scheme will be the same as the second byte).

It will be seen in FIG. 2 that the count, the sequence, and the checksum are not encoded as ASCII characters. Usually the reason for such an encoding is that the underlying values could potentially resemble the ETX (or any other control) character and thus prematurely terminate the packet. The present scheme guarantees that the ETX character is unique in the packet. The receiving station need only check for the ETX to determine the end of the packet. This eliminates the need for "transparency" mode or encoding control fields as ASCII characters.

The ability of the invention to find a unique ETX for each data packet is based on the operating principle of selecting a "dynamic" ETX character after the data comprising the packet have been assembled. Since the preferred packets are limited to a maximum length of 256, and since ETX-related characters account for 3 of these 256 bytes (i.e., first ETX, ETX complement and last ETX), a maximum of 253 different character codes could actually appear in the data excluding the ETX characters. It is necessary only to find one of the remaining 3 character codes to be the ETX character.

The technique that enables the scheme to detect errors and recover from them will now be described. Firstly, if one or more non-ETX bytes are lost during transmission, this will be detected by a premature reception of the last ETX character and hence the byte count value in the packet will not match the number of bytes received. On the other hand, if the byte count is correct, but an error has occurred, then the checksum will be incorrect. This latter error will be detected only to the extent that the checksum algorithm detects the error. If the ending ETX character is lost, then upon receiving what is supposed to be the last byte of the packet, the receiver in checking to see that it is an ETX character will detect that an error has occurred. Also, if the byte count is wrong, then the appropriate last character will not be an ETX. Knowing the ETX character, the checksum, and the number of bytes to be transmitted enables the system to detect invalid packets.

It is possible that the ETX character in the second byte of the packet will be incorrect and go undetected by the checksum algorithm. This could prevent the system from getting back in synchronism (sync). For this reason the complement of the ETX character is transmitted as the third byte. (The complement provides a little more robustness than a simple duplication.) The receiver needs to verify that the ETX complement is correct and hence has a valid ETX character.

Once an error has been detected, recovery is simple. The receiver throws away the packet and looks for the sync pattern which is (STX ETX ETXINV SEQ) where SEQ is the sequence number of the last correctly received packet plus one. Until this pattern is established, the receiver does not activate its error checking and detection algorithm. The receiver always initiates a search for a new ETX, even if the packet had a "good" ETX but a different type of error. There is no memory of previous packets beyond the sequence number required.

When the host or the terminal has a sequence of packets constituting one data unit to be sent, it does so in the stream mode (i.e., data packets are sent one after another without waiting for an explicit ACK or "A" for each packet). Only a final ACK is required to indicate successful reception. If the transmitter does not receive the final ACK, it can send an "R" (resend). In case an error is detected in an intermediate packet, an "N" or NACK is sent by the receiver along with the sequence number of the last correctly received packet. The transmitter then backs up in the sequence and retransmits the packets identified by the receiver. After an error, the receiver starts looking for the sync pattern as explained above. Such a protocol involves very little overhead during correct transmission which is likely to be the usual case.

The sequence control flag aids in determining the appropriate response to ACK, NACK and R (resend) packets. Without this flag, certain combinations of transmission errors could result in entire data units being lost or duplicated. Two examples of such errors are as follows.

Case 1: Lost Data Units. Suppose the receiver receives a data unit and sends an ACK packet. It remembers that it sent the ACK in case the transmitter requests a resend (R). The sender correctly receives the ACK and transmits a new data unit. However, the new data unit (which is contained in a single packet) is not received at the receiver. Therefore, the receiver never sends an ACK for it. Because it never receives an ACK, the transmitter sends a resend (R) packet. The receiver responds by sending the "A" for the previous unit. The sender receives this ACK and mistakenly assumes that the receiver got the new data unit. Thus, the new data unit has been lost and neither the receiver nor the sender has detected the loss.

Case 2: Duplicate data units. Again, suppose that the receiver correctly receives a data unit and sends an ACK packet. Noise occurs on the communications line and propagates to both the receiver and the sender. On the sender's side, the noise garbles the ACK packet, so the sender never receives it. On the receiver's side, the noise appears as the beginning of a new data unit from the sender. The receiver recognizes that this "new" transmission is incorrect and sends a NACK packet, indicating that it has not received any of the packets in the new unit. The sender correctly receives the NACK and incorrectly assumes that the data it just sent was lost. It therefore retransmits the entire sequence. The duplicate transmission arrives perfectly at the receiver which accepts it as the anticipated new data unit.

These errors arise because of an inability to distinguish between a data unit and its immediate successor. To prevent them, a sequence control value of 0 or 1 is assigned to all of the packets in a data unit. The value is incremented modulo 2 for each new unit that is sent. At any point in time, the receiver expects the sequence control flag in an incoming packet to have a particular value. Only packets with the expected value are accepted. When the last packet in a unit arrives, the receiver sends an ACK packet and increments its expected sequence control value modulo 2.

The sequence control flag in an ACK packet is set to match that of the packets it is meant to acknowledge. The sequence control flag in a NACK packet is set to the value the receiver currently expects. The sequence control flag in a resend (R) packet is set to that of the data packet(s) for which no response was received.

An ACK packet is accepted only if the ACK packet's sequence control flag matches that of the data unit just transmitted. In response to a NACK packet, data is retransmitted only if the sequence control flag in the NACK packet matches that of the data packets currently being sent. In response to a resend (R) packet, the previous ACK or NACK packet is resent only if its sequence control flag matches that of the resend (R) packet. Otherwise, a NACK packet with a sequence control flag equal to the value currently expected is the appropriate response. With this scheme, neither data loss nor duplication can occur.

Sending data in the stream mode has one potential disadvantage. If the data unit to be transmitted is large, a correspondingly large area of memory may be tied up until the final ACK packet is received. In order to alleviate this situation, the "P" or pause packet may be used by the transmitter to ask for an acknowledgement at appropriate intervals during a long transmission. In the preferred embodiment, this interval is set at 2048 bytes. When an "A" packet is received in response to a "P" packet, the transmitter can release the buffer used to hold data that was previously transmitted but not acknowledged.

It will accordingly be seen that a system and method are disclosed which offer low-cost, high-efficiency, automatic detection and correction of asynchronous transmission errors and which are capable of use with standard modems.

Having thus described our invention, what we claim as new and desire to secure by Letters Patent is:

1. A method for detection of and recovery from transmission errors over asynchronous communication lines carrying transmissions, such as Videotex signals, between transmitting and receiving stations, comprising the steps of:

produced the transmissions in data packets containing n bytes, with the first byte in each packet being the ASCII character STX (X'02');

selecting an ETX character for each packet after the data comprising the packet has been assembled, which ETX character is different from the remaining character codes in its respective packet and is made the second byte thereof;

coding the third byte in each packet as the complement of the ETX character selected for the respective packet;

coding the fourth byte in each packet to be indicative of the location of each respective packet in a set of data packets in a given transmission sequence;

coding the fifth and sixth bytes in each packet to be indicative of the number of data bytes in the respective packet;

coding the seventh byte in each packet as a sequence control flag distinguishing said set of data packets from another transmission sequence;

coding the eighth byte in each packet to be a control character;

making all but the last three remaining bytes in each packet, data bytes;

making the next to last two bytes in each packet, checksum bytes;

making the last byte in each packet the same as the ETX character of the second byte in the respective packet to indicate the end of each packet;

detecting errors with respect to either of the ETX character bytes, by respectively checking the third and second bytes in the packet;

checking data errors by the checksums;

discarding packets determined to be erroneous; and using the unique combination of said first four bytes to detect the packet with the fourth byte next following that of the last correct packet in said transmission sequence to determine the point at which transmission is to be resumed.

2. A method as in claim 1 comprising the further steps of:

(a) creating a table of $2^y$ dividend modifiers by respectively applying the traditional bit-at-a-time CRC algorithm to each of the possible y-bit sequences and storing the results in said table at the locations indexed by the original y-bit values;

(b) computing the CRC remainder of any k×y message using one of the standard CRC generator polynomials by:

(1) computing the CRC remainder of a k-byte message by appending 2 bytes of 0's to the low order end of the message to form a k+2 byte dividend; and (2) repeating the following steps k times:

(i) using the leftmost dividend byte, byte 0, as an index into the table of dividend modifiers, combining bytes 1 and 2 with the designated sixteen-bit dividend modifier using an EXCLUSIVE OR; and (ii) shifting the dividend left 8 positions, forming an augmented message; and (c) inserting the final bytes, 0 and 1, into the two appended bytes of the augmented message to form a revised message.

3. A method as in claim 2 comprising the further steps of:

(d) receiving said revised message at said receiving station;

(e) recomputing the CRC remainder using said repeated steps; and (f) after k iterations, checking bytes 0 and 1 of the dividend to determine if they are zero, whereupon the message has been received without error.

4. A method as in claim 1 comprising the further steps of:

storing duplicates of said transmissions in a buffer at said transmitting station;

transmitting a pause packet at selected intervals during a long transmission asking for an acknowledgement from said receiving station; and releasing said duplicates from said buffer upon receipt of an acknowledgement packet from said receiving station.

5. A method for detection of and recovery from transmission errors over asynchronous communication lines between transmitting and receiving stations, comprising the steps of:

producing the transmissions in packets containing n bytes, with the first byte in each packet being coded as a start-of-transmission character STX;

selecting an end-of-transmission character ETX for each packet after the data to be transmitted in the packet has been assembled, which ETX character is different from the remaining character codes in its respective packet and is made the second byte thereof;

making the third byte in each packet the complement of the ETX character selected for the respective packet;

making the bytes preceding the last three bytes in each packet data bytes;

making the next-to-last two bytes in each packet, checksum bytes;

making the last byte in each packet the same as the ETX character of the second byte to indicate the end of each packet, whereby the ETX character bytes are distinguishable from data bytes, and errors in either instance thereof are respectively checked by the third and second bytes in the packet, while data errors are checked by the checksums;

checking each packet for errors and halting transmission when an erroneous packet is detected;

discarding packets found to be erroneous; and after an erroneous packet is detected and discarded, using the unique combination of said first four bytes to detect the packet with the fourth byte next following that of the last correct packet in said transmission sequence to determine the point at which transmission is to be resumed.

6. A system for detection of and recovery from transmission errors over asynchronous communication lines between transmitting and receiving stations, comprising:

means for producing the transmissions in packets containing n bytes, with the first byte in each packet being coded as a start-of-transmission character STX;

means for selecting an end-of-transmission character ETX for each packet after the data to be transmitted in the packet has been assembled, which ETX character is different from the remaining character codes in its respective packet and is made the second byte thereof;

means for making the third byte in each packet the complement of the ETX character selected for the respective packet;

means for making the bytes preceding the last three bytes in each packet data bytes:

means for making the next-to-last two bytes in each packet, checksum bytes;

means for making the last byte in each packet the same as the ETX character of the second byte to indicate the end of each packet, whereby the ETX character bytes are distinguishable from data bytes, and errors in either instance thereof are respectively checked by the third and second bytes in the packet, while data errors are checked by the checksums;

means for checking each packet for errors and halting transmission when an erroneous packet is detected;

means for discarding packets found to be erroneous; and means, after an erroneous packet is detected and discarded, for using the unique combination of said first four bytes to detect the packet with the fourth byte next following that of the last correct packet in said transmission sequence to determine the point at which transmission is to be resumed.

7. A system for detection of and recovery from transmission errors over asynchronous communication lines carrying transmissions, such as Videotex signals, between transmitting and receiving stations, comprising:

means for producing the transmissions in data packets containing n bytes, with the first byte in each packet being the ASCII character STX (X'02');

means for selecting an ETX character for each packet after the data comprising the packet has been assembled, which ETX character is different from the remaining character codes in its respective packet and is made the second byte thereof;

means for coding the third byte in each packet as the complement of the ETX character selected for the respective packet;

means for coding the fourth byte in each packet to be indicative of the location of each respective packet in a set of data packets in a given transmission sequence;

means for coding the fifth and sixth bytes in each packet to be indicative of the number of data bytes in the respective packet;

means for coding the seventh byte in each packet as a sequence control flag distinguishing said set of data packets from another transmission sequence;

means for coding the eighth byte in each packet to be a control character;

means for inserting data bytes following the eighth byte in each packet;

means for making the two bytes following said data bytes in each packet, checksum bytes;

means for making the byte following said checksum bytes the last byte in each packet and the same as the ETX character of the second byte in the respective packet to indicate the end of each packet;

means for detecting errors with respect to either of the ETX character bytes, by respectively checking the third and second bytes in the packet;

means for checking data errors by the checksums;

means for discarding packets determined to be erroneous; and means, using the unique combination of said first four bytes, for detecting the packet with the fourth byte next following that of the last correct packet in said transmission sequence to determine the point at which transmission is to be resumed.

8. A system as in claim 7 wherein said checksum bytes making means comprises means for making said checksum bytes indicative of the total number of bytes in the respective packet less four.

9. A system as in claim 7 wherein said checksum bytes making means comprises means for making said checksum bytes provide a cyclical redundancy check.

10. A system as in claim 7 further comprising:
(a) means for creating a table of $2^y$ dividend modifers by respectively applying the traditional bit-at-a-time CRC algorithm to each of the possible y-bit sequences and storing the results in said table at the locations indexed by the original y-bit values;
(b) means for computing the CRC remainder of any k×y message using one of the standard CRC generator polynomials comprising:
  (1) means for computing the CRC remainder of a k-byte message by appending 2 bytes of 0's to the low order end of the message to form a k+2 byte dividend; and
  (2) means for actuating the following means k times:
    (i) means for using the leftmost dividend byte, byte 0, as an index into the table of dividend modifiers, combining bytes 1 and 2 with the designated sixteen-bit dividend modifier using an EXCLUSIVE OR; and
    (ii) means for shifting the dividend left 8 positions; and
(c) means for inserting the final bytes, 0 and 1, into the two appended bytes of the augmented message to form a revised message.

11. A system as in claim 10 comprising:
(d) means for receiving said revised message at said receiving station;
(e) means for recomputing the CRC remainder using said repeated actuations; and
(f) means, after k actuations, for checking bytes 0 and 1 of the dividend to determine if they are zero, whereupon the message has been received without error.

12. A system as in claim 7 further comprising:
a buffer at said transmitting station;
means for storing duplicates of said transmissions in said buffer at said transmitting station;
means for transmitting a pause packet at selected intervals during a long transmission asking for an acknowledgement from said receiving station; and
means for releasing said duplicates from said buffer upon receipt of an acknowledgement packet from said receiving station.

13. A method of producing transmissions over asynchronous communication lines comprising the steps of:

producing the transmissions in data packets containing n bytes, with the first byte in each packet being the ASCII character STX (X'02');

selecting another character for each packet after the data comprising the packet has been assembled, the code of said another character being different from the remaining character codes in its respective packet and making said another character the second byte of said packet;

coding the third byte in each packet as the complement of said another character selected for the respective packet;

coding the fourth byte in each packet to be indicative of the location of each respective packet in a set of data packets in a given transmission sequence;

coding the fifth and sixth bytes in each packet to be indicative of the number of data bytes in the respective packet;

coding the seventh byte in each packet as a sequence control flag distinguishing said set of data packets from another transmission sequence;

coding the eighth byte in each packet to be a control character;

making all but the last three remaining bytes in each packet, data bytes;

making the next to last two bytes in each packet, checksum bytes; and making the last byte in each packet the same as the character of the second byte in the respective packet to indicate the end of each packet.

14. A method as in claim 13 wherein said checksum bytes are made indicative of the total number of bytes in the respective packet less four.

15. A method as in claim 13 wherein said checksum bytes provide a cyclical redundancy check.

16. A method as in claim 13 wherein n equals 256.

17. A method as in claim 13 wherein said fourth byte is an eight-bit unsigned integer.

18. A method as in claim 13 wherein said fifth and sixth bytes form a sixteen-bit unsigned integer.

19. A method as in claim 13 wherein said eighth byte is indicative of the function of the respective packet.

20. A method as in claim 19 wherein said eighth byte is an ASCII character.

* * * * *